United States Patent

[11] 3,550,498

| [72] | Inventor | Franklin S. Briles<br>No. 6 Middleridge Lane, Rolling Hills,<br>Calif. 90274 |
|---|---|---|
| [21] | Appl. No. | 747,849 |
| [22] | Filed | July 26, 1968 |
| [45] | Patented | Dec. 29, 1970 |

[54] SELF-SEALING NUT ASSEMBLY
2 Claims, 12 Drawing Figs.

[52] U.S. Cl. .................................................. 85/32, 85/1, 151/7, 151/14
[51] Int. Cl. ..................................................... F16b 37/00
[50] Field of Search .......................................... 85/32, 32Int, 7, IJP; 151/7, 38, 14.5, 14DW; 287/189.36F

[56] References Cited
UNITED STATES PATENTS

| 1,443,751 | 1/1923 | Lafever et al. | 151/14.5 |
|---|---|---|---|
| 2,761,349 | 9/1956 | Heller | 85/32 |
| 3,040,796 | 6/1962 | Gouverneur | 151/7 |
| 3,086,421 | 4/1963 | Hamman | 85/32 |
| 3,137,196 | 6/1964 | Stawinski | 85/32Int |
| 3,137,197 | 6/1964 | Meyer | 85/32Int |
| 3,139,786 | 7/1964 | Ardell | 85/7 |
| 3,316,952 | 5/1967 | Hollinger | 151/7 |
| 3,350,975 | 11/1967 | Bien | 85/32 |
| 3,464,472 | 9/1969 | Reynolds | 85/7 |

FOREIGN PATENTS

| 541,969 | 12/1941 | Great Britain | 151/7 |
|---|---|---|---|
| 880,397 | 10/1961 | Great Britain | 151/7 |
| 1,006,102 | 9/1965 | Great Britain | 151/14DW |
| 970,952 | 6/1950 | France | 151/7 |

Primary Examiner—Marion Parsons, Jr.
Attorney—Albert L. Gabriel

ABSTRACT: A self-sealing nut assembly of the type having a deformable annular seal located in the counterbore of the nut. According to the invention a plurality of pressure control gates, preferably in the form of grooves in the nut face, communicate with the counterbore to allow controlled release of excess seal material from the counterbore cavity, while at the same time providing controlled sealing pressure within the counterbore.

PATENTED DEC 29 1970
3,550,498
SHEET 1 OF 3
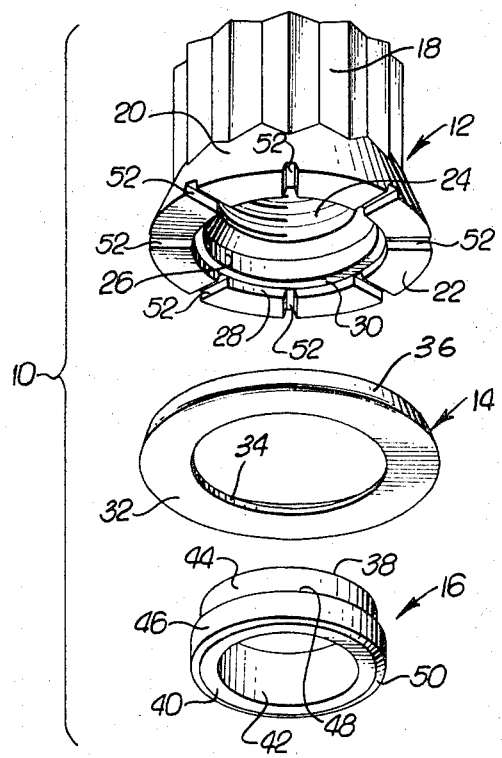
FIG. 1.
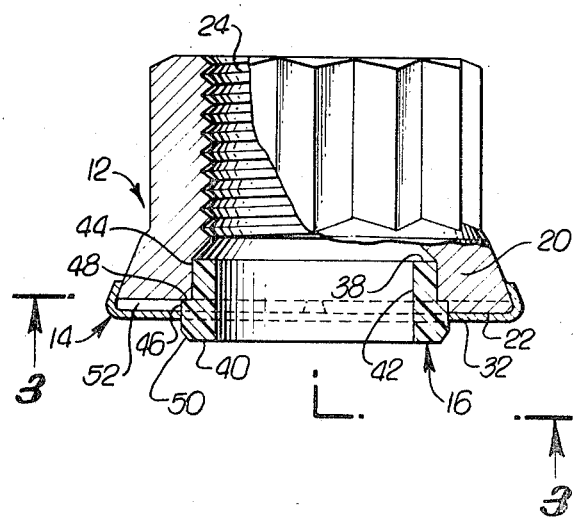
FIG. 2.
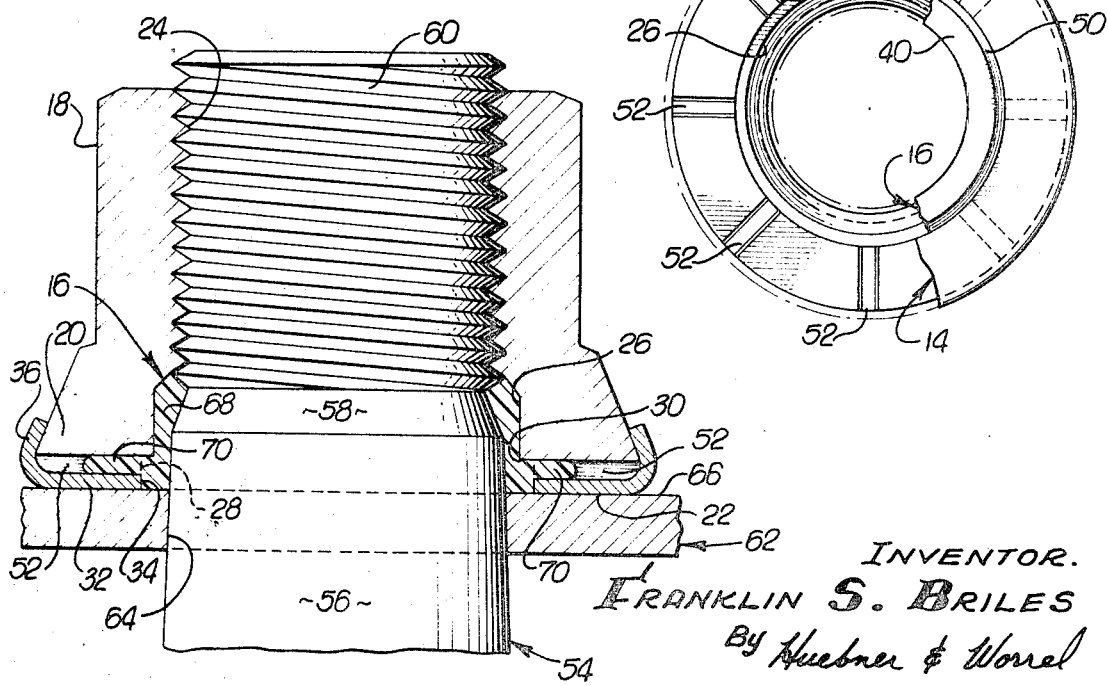
FIG. 3.
FIG. 4.
INVENTOR.
FRANKLIN S. BRILES
By Huebner & Worrel
ATTORNEYS.

INVENTOR.
FRANKLIN S. BRILES
By Huebner & Worrel
ATTORNEYS.

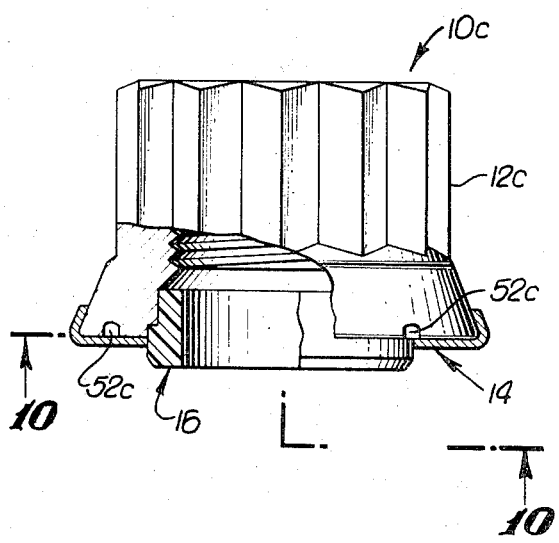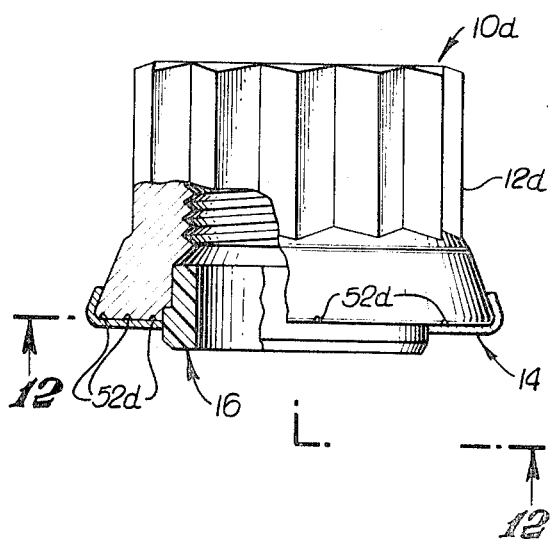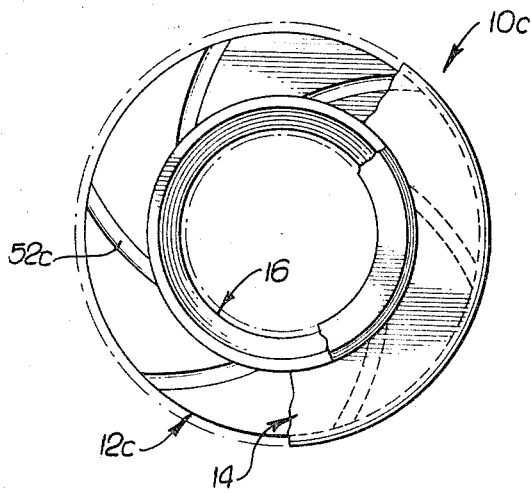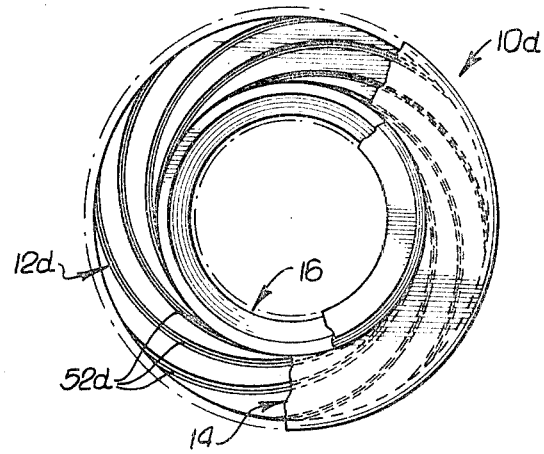
INVENTOR.
FRANKLIN S. BRILES
By Huebner & Worrel
ATTORNEYS.

SELF-SEALING NUT ASSEMBLY

BACKGROUND OF THE INVENTION

It is important in some types of bolted joints that the bolt holes be effectively sealed against the flow of fluids, or release of pressure. Such sealing of bolt holes is of critical importance in a number of different types of aircraft structures, as for example in wet wing areas, fuel tanks, pressurized cabins, various other pressurized vessels such as hydraulic reservoirs, bulkheads, conduit coupling flanges and the like.

Several different methods of sealing bolt holes have come into common usage in the aircraft industry, but because of the questionable reliability of some of these methods and because of the criticality of the sealing requirement, it is common practice in the aircraft industry to provide redundant sealing; i.e., to provide more than one form of seal for a particular bolt hole.

One prior art method of establishing a seal in a bolted joint is to utilize an interference fit-tapered bolt-and-hole combination as disclosed in U.S. Pat. No. 3,034,611, issued May 15, 1962, to John Zenzic. While such a tapered interference bolted joint provides a generally satisfactory seal, the aircraft industry prefers not to rely entirely upon such a metal-to-metal seal in critical areas such as in a wet wing area, and accordingly an additional sealing means is added.

One such additional sealing means which has been utilized in conjunction with tapered interference-type bolts, as well as with other types of bolts, is to dip the bolts into a two-part curable polysulfide rubber compound (including both catalyst and base) immediately prior to installation. Such a compound is MIL-S-8802, Type A. However, this type of sealing is rather difficult and time-consuming, involving an undesirably large amount of labor. One problem with this type of sealing is that the two-part curable sealing material has only about a 15-minute pot life, so that fresh compound must be repeatedly mixed in small batches. Another problem with this type of sealing is that a substantial amount of the compound extrudes forwardly into the nut area, and when the nut is tightened up, the material acts as a cushion between the nut and the structure. This cushion flows and relieves the tension on the bolt, requiring further tightening after the flow has completed and the compound set up. Also, such material which is squeezed out from between the nut face and the structure is likely to become broken off in a fuel reservoir, with the possibility of clogging a fuel line.

Another wet wind area approach to bolt sealing is the use of caps or covers which are clipped over the nuts and sealed against the structure after installation of the bolts. Such additional parts add undesirable weight and require a considerable amount of extra labor in the bolt installation.

A further means for sealing bolted joints which is coming more and more into use is to embody a deformable sealing ring or sleeve in the nut counterbore, the sleeve projecting axially outwardly beyond the face of the nut prior to installation, and being squeezed down into the counterbore when the nut is tightened up against the structure so as to seal off all leak paths such as between bolt and nut threads, between the nut counterbore and the bolt shank end, and between the nut face and the structure. This approach to bolt sealing is generally favored in the aircraft industry for the reasons that it provides a resilient or deformable type of plastic seal rather than relying upon a metal-to-metal seal, it does not require further parts in addition to the nut and bolt, such as nut caps, and it does not involve the problems noted above associated with the use of dip type of sealant.

However, prior to the present invention, such self-sealing nuts of the type having a deformable plastic insert in the nut counterbore have had some serious drawbacks. The biggest problem with such self-sealing nuts in the past has been trying to achieve the correct balance between the amount of sealing material employed in the sealing ring or sleeve and the volume of the counterbore cavity. If there is insufficient sealing material, then when the nut is tightened up the counterbore cavity will not be completely filled, and hence the seal will be inadequate. On the other hand, if there is too much volume of sealing material, then a variety of problems can arise. For example, when the nut is tightened up a very high hydrostatic pressure can be developed in the nut counterbore, which could rupture the nut or develop a leak path where the flow of sealing material tends to be channeled out between the nut face and the structure. Such an excess of seal material can also result in the development of a cushion of the seal material between the nut face and the structure as the seal material is squeezed out of the nut cavity, and even though the nut may be torqued up tightly, later cold flow of the seal material will relieve the tension applied to the joint by the bolt, thereby weakening the joint.

This prior art problem of attempting to balance the amount of material in the seal against the volume of the nut counterbore cavity has, prior to the present invention, been made extremely difficult because of the tolerance variations in the thickness of the structure being bolted and in the length of the bolts. In high strength aircraft bolted joints such as those disclosed in the aforesaid Zenzic U.S. Pat. No. 3,034,611, the bolt shank or grip will normally extend entirely through the structure and project slightly beyond the surface of the structure so as to penetrate somewhat into the nut counterbore. Since this shank or grip part of the bolt has a somewhat larger diameter than the mean thread diameter, the extent of the penetration of the shank into the nut counterbore will determine the volume of the counterbore that is available to receive sealing material. Hence, tolerance variations in the thickness of the structural members being bolted together, and in the length of the bolt shank, will cause variations in the volume of the counterbore. These tolerance variations can be substantial, with variations on the order of .078 of an inch not being unusual.

For these reasons, prior art self-sealing type nuts have not been generally reliable in a effecting the desired seal of the bolted joint, and have sometimes even weakened the structural strength of the joint.

Prior to the present invention, the usual means that was employed to attempt to provide a satisfactory balance between the amount of the seal material and the volume of the cavity defined between the nut counterbore and the bolt was to provide a substantial enlargement of the nut counterbore in an attempt to provide more room for packing in the seal material when the nut was torqued up. This, of course, required an overall enlargement of the nut in order to maintain the prescribed structural strength, with the net result being that such prior art self-sealing nuts were generally considerably heavier than conventional nuts of comparable structural strength. This, of course, was a serious drawback of such prior art self-sealing nuts since weight is always a critical problem in aircraft structure.

An additional problem in connection with such prior art self-sealing nuts is that after the nut was torqued up, the sealing insert became locked more tightly to the bolt and structure than to the nut itself, so that when the nut was removed, the insert remained on the bolt, whereby the reuse of the self-sealing nut was prevented.

Further, as with the dip type of sealant, if the volume of seal material was considerably larger than the available space in the nut cavity, when such prior art self-sealing nuts were torqued up tightly, there was a likelihood that some of the seal material would be extruded out into a wet wind wing or tank area and broken off, with the consequent possibility of a fuel line stoppage.

SUMMARY OF THE INVENTION

In view of these and other problems in the art, it is an object of the present invention to provide a novel self-sealing nut assembly having a deformable annular plastic seal located in and projecting axially outwardly from a counterbore in the nut, which includes a plurality of pressure control gates which communicate with the counterbore to allow controlled release of excess seal material from the counterbore cavity, while at the same time allowing the cavity to be solidly filled with sealing material under controlled sealing pressure.

Another object of the invention is to provide a self-sealing nut assembly of the character described wherein the pressure control gates are in the form of grooves in the nut face which communicate with the counterbore of the nut and extend radially outwardly from the counterbore, the grooves being sufficiently small in cross section to provide substantial pressurization of the seal material in the nut cavity for effective sealing, and to provide a back pressure against continued cold flow of the sealing material to prevent relaxing of the bolted joint after the nut has been completely tightened up; while at the same time the grooves have sufficient overall volume because of their lineal extent to receive and retain therein substantially all of the excess volume of plastic seal material displaced when the nut is tightened up and the bolt shank enters the counterbore of the nut, thereby channeling the excess volume of plastic to a noncritical location, and preventing the plastic from being extruded out into a critical area such as a wet wing area, preventing excess material from forming into a cushion which would later relax, and preventing the entrapment of excess material in the nut cavity and consequent buildup of undesirably high hydrostatic pressure in the cavity which might cause rupturing of the nut or development of leak paths through high pressure channeling.

A further object of the invention is to provide a self-sealing nut assembly of the character described wherein the pressure control gates are equally effective on nuts with or without washers adapted to be clamped between the nut faces and the structures being fastened.

Another object of the invention is to provide a self-sealing nut assembly of the character described wherein the radial "-nibs" formed by displacement of seal material into the pressure control gates cause the nut to capture the insert so that the insert will rotate with the nut upon removal of the nut, thereby allowing reuse of the sealing nut.

A still further object of the invention is to provide a self-sealing nut assembly of the character described wherein the pressure control gates permit a full plastic seal in the nut cavity with a predictable pressurization of the seal, despite substantial axial tolerance of the bolt shank or grip in the nut counterbore. Sufficient seal material is provided so that there will be some overflow of the seal material into the pressure control gates even with minimum projection of the bolt shank through the bolt hole, and the pressure control gates will provide adequate space to receive all of the overflow despite maximum projection of the bolt shank out of the bolt hole, so that over the entire tolerance range the seal will be complete and the pressurization thereof will be predictable.

A further and broader aspect of the present invention is the provision in a nut of pressure control gates of the character described which are adapted to allow the controlled escape of either wet or dry sealing material from within the nut so as to provide a seal of controlled pressurization and to prevent the accumulation of a cushion of sealing material between the nut and the structure and thereby prevent subsequent joint relaxation.

An additional object of the invention is to provide a self-sealing nut assembly of the character described which, because of the presence of the pressure control gates, provides an effective and reliable seal with a nut counterbore cavity of minimal dimensions, resulting in a nut assembly which is particularly light in weight and hence of particular utility for use in aircraft.

A further object is to provide a self-sealing nut assembly comprising the combination of a nut member, a captive washer member peripherally retained on the bottom of the nut member and having a work-engaging portion extending radially inwardly over the face of the nut member, and an annular insert of deformable plastic material seated in the counterbore of the nut member and projecting axially outwardly beyond the captive washer member, wherein one of said members is provided with a plurality of pressure control gates of the character described at the interface between the members, whereby when the assembly is torqued up against structure being fastened, the insert will be deformed to provide a seal under controlled pressure in the cavity defined within the nut and washer members.

A still further object of the invention is to provide a self-sealing nut assembly having pressure control channels or gates of the character described wherein the small size of the counterbore permitted by the gates allows the counterbore to be stepped to provide an annular shoulder closely opposing the structure surface against which the nut seats, the controlled pressurization of sealing material between said shoulder and said surface enhancing the effectiveness of the seal.

Other objects and advantages of the present invention will appear during the course of the following part of the specification, wherein the details of construction and mode of operation of presently preferred embodiments are described with reference to the accompanying drawings, wherein:

BRIEF DESCRIPTION OF THE DRAWINGS

FIG. 1 is an exploded, perspective view of a first form of self-sealing nut assembly according to the present invention.

FIG. 2 is an axial section, partly in elevation, of said first form of the nut assembly with the parts thereof in assembled condition.

FIG. 3 is a bottom view of the said first form of the nut assembly taken on line 3–3 in FIG. 2, showing the nut in bottom plan, with portions of the captive washer and sealing sleeve broken away.

FIG. 4 is an axial section, partly in elevation, illustrating the self-sealing nut assembly of FIGS. 1, 2 and 3 torqued up on the threaded end of a bolt against structure being fastened.

FIG. 5 is an axial section, partly in elevation, similar to FIG. 2, but illustrating a second form of self-sealing nut assembly according to the invention.

FIG. 9 is an axial section, partly in elevation, similar to FIGS. 2, 5 and 7, but illustrating a fourth form of the invention.

FIG. 10 is a bottom view similar to FIGS. 3, 6 and 8, but taken on the line 10–10 in FIG. 9.

FIG. 11 is an axial section, partly in elevation, similar to FIGS. 2, 5, 7 and 9, but illustrating a variation of said fourth form of the invention.

FIG. 12 is a bottom view similar to FIGS. 3, 6, 8 and 10, but taken on the line 12–12 in FIG. 11.

DETAILED DESCRIPTION

Figure 5:
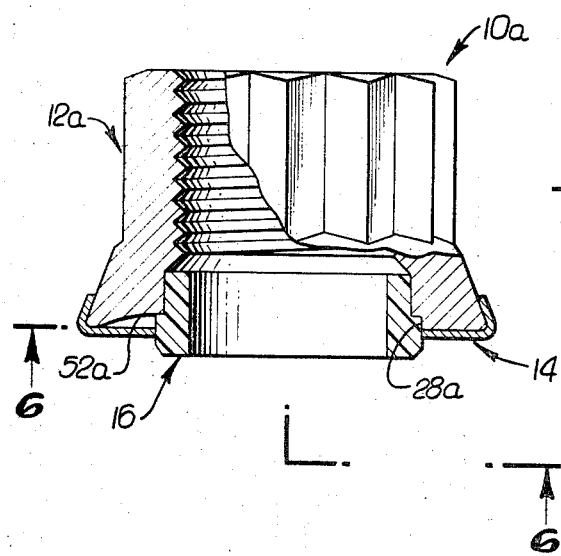
FIG. 5 is an axial section, partly in elevation, illustrating the self-sealing nut assembly of FIGS. 1, 2 and 3 torqued up on the threaded end of a bolt against structure being fastened.

Referring to the drawings, and at first particularly to FIGS. 1 to 4 thereof, these views illustrate a first form of the invention wherein the pressure control gates or channels are in the form of radially directed grooves extending between the inner and outer peripheral edges of the nut face. This first form of nut assembly is generally designated 10, and includes a nut body 12, a captive washer 14 and a deformable sealing insert 16.

The nut body 12 includes an upper wrenching portion 18 which may have any desired wrenching configuration, as for example the conventional hexagonal shape, or a 12-point wrenching configuration as illustrated in the drawings. The nut body 12 includes an enlarged base portion or flange 20 having the nut face 22 thereon. The nut face 22 is generally planar and normal to the axis of the nut. The nut further includes a threaded bore 24 extending therethrough, with a primary counterbore 26 at the lower end portion thereof, and a secondary counterbore 28 opening at the nut face 22. The primary counterbore 26 is somewhat larger in diameter than the thread root diameter, and extends axially inwardly from the nut face 22 a sufficient distance to accommodate entry of the upper end of the bolt shank therein despite tolerance variations in the length of the bolt shank and the thickness of the structure being fastened. The secondary counterbore 28 has a somewhat larger diameter than the primary counterbore 26, but is shallow, extending only a short distance in from the nut face 22 so as to present a downwardly facing shoulder 30.

The captive washer 14 has an annular base portion 32 which may be either flat as illustrated in the drawings or frustoconical as so shown in applicant's prior U.S. Pat. No. 3,144,803, issued Aug. 18, 1964. The base portion 32 of washer 14 has an inner annular edge 34 of substantially the same diameter as the secondary counterbore 28, and at the outer annular edge of the base portion 32 the washer 14 includes an upturned peripheral retaining lip 36 which is bent inwardly over the base portion 20 of the nut so as to be captive on the nut, but freely rotatable relative to the nut.

The annular sealing insert 16 is shown in its uncompressed condition in FIGS. 1 and 2, and in this condition it is generally in the form of a cylindrical sleeve, having an upper end surface 38 normal to its axis, a lower end surface 40 also normal to its axis and somewhat wider than the upper end surface 38, and a cylindrical inner surface 42 extending between the upper and lower end surfaces 38 and 40 respectively. The outside of sealing insert 16 is of stepped configuration, approximately the upper half of the outside being defined by an outer surface portion 44, and approximately the lower half of the outside being defined by lower outer surface portion 46 which is of larger diameter than the upper outer surface portion 44. An upwardly facing annular shoulder 48 is disposed between the outer surface portions 44 and 46, having substantially the same radial extent as and being adapted to seat against the upper end of secondary counterbore 28 in the nut body. Chamfer 50 is provided at the lower, outer corner of the insert 16, i.e., between the lower end surface 40 and the outer surface portion 46.

It will thus be seen that the outside of the sealing insert 16 is generally complementary to the inside of the nut body 12 and washer 14 in the lower portion of the nut. Thus, as best illustrated in FIG. 2, in the uncompressed or relaxed condition of the sealing insert 16, the insert is adapted to be snugly fitted within the lower portion of the nut body with the upper outer surface portion 44 of the sealing insert engaged against the surface of primary counterbore 26, the lower outer surface portion 46 of the sealing insert engaged against the surface of secondary counterbore 28 and the inner edge 34 of the washer 14, and the upwardly facing shoulder 48 of the sealing insert 16 which projects down seated against the upper end of secondary counterbore 28. In this seated position of the sealing insert in the nut as illustrated in FIG. 2, a substantial portion of the sealing insert 16 projects axially downwardly beyond the exposed face of the captive washer 14 so that upon engagement of the nut assembly 10 against structure being fastened, the sealing insert 16 will be compressed upwardly into the cavity formed between the bolt on the one hand and the nut counterbores 26 and 28 and the inner edge 34 of the washer on the other hand.

It is to be noted that the lower end portion of sealing insert 16 which projects downwardly beyond the washer as shown in FIG. 2 is relatively thick and terminates at a relatively wide lower end surface 40. This wide footprint gives the exposed, outwardly projecting lower end portion of the sealing insert 16 sufficient structural rigidity, despite the deformable nature of the insert, to prevent buckling thereof and consequent protrusion thereof outwardly across the face of the washer. Nevertheless, because of the deformability of the sealing insert material, there will be some widening of the insert 16 proximate its lower end surface 40 when the nut assembly is tightened against a structural member, and it is for this reason that the chamfer 50 is provided. The chamfer 50 involves the removal of approximately the amount of sealing material that otherwise would be likely to be sheared off by the inner edge of the washer as the outwardly protruding part of the sealing insert 16 is compressed into the nut and washer cavity when the nut is torqued up against a structural member.

The pressure control gates in the nut assembly 10 are provided by means of a plurality of radially oriented grooves or channels 52 which are regularly spaced about the nut face 22, eight of such grooves or channels 52 being disclosed in FIGS. 1 to 4 of the drawings. These grooves or channels 52 extend to a depth approximately equivalent to the depth of the secondary counterbore 28, and are generally U-shaped in cross section. As best illustrated in FIG. 4, when the base portion 32 of the captive washer 14 is compressed flush against the face 22 of the nut body, the base portion 32 of the washer then completely covers the grooves or channels 52 so that the pressure control gates formed thereby are in effect a series of radially directed passages communicating at their inner ends with the cavity of the nut assembly, and extending radially outwardly to the periphery of the nut body 12. Although the upturned peripheral retaining lip 36 of the captive washer 14 generally encloses these passages, nevertheless the retaining lip 36 does not seal off the outer ends of these passages, so that air will be permitted to bleed out from the outer ends of these passages as sealing material flows into the passages from their inner ends.

FIG. 4 illustrates a typical bolt 54 which will be employed in conjunction with the nut assembly 10, the bolt 54 having a shank or grip portion 56 which connects by a taper 58 with the threaded upper end portion 60 of the bolt. The shank 56 has a somewhat larger diameter than the outer diameter of threads 60. The present invention may be employed in connection with either straight or cylindrical shank bolts, or tapered shank bolts for an interference type connection in accordance with the aforesaid Zenzic U.S. Pat. No. 3,034,611. The bolt 54 illustrated in FIG. 4 is shown with a tapered shank or grip portion 56 in accordance with the teachings of the said Zenzic patent.

Also shown in FIG. 4 is a structural member 62 having a bore 64 therethrough and an exposed upper surface 66 against which the nut assembly is adapted to seat.

The bolt 54 is engaged through the bore 64 of structure 62 so that the threaded end portion 60 of the bolt is exposed above the upper surface 66 of structure 62, and then the nut assembly 10 is threadedly engaged on this exposed upper end of bolt 54 and torqued down tightly against the surface 66 of the structure, seating the bolt in the structure as shown in FIG. 4. Preferably, the upper end of the bolt shank 56 will extend somewhat above the structure surface 66 to assure that the structure bore 64 is completely filled by the bolt shank despite tolerance variations in the length of the bolt shank and the thickness of the structure. Thus, typically the bolt shank 56 will extend upwardly into the nut counterbore 26 as shown in FIG. 4 when the nut assembly is torqued down tightly against the structure and the bolt 54 is thereby drawn through the structure 64 to its furthest extent.

In accordance with the present invention, the total volume of sealing material in the sealing insert 16 is slightly greater than the maximum volume of the cavity 68 defined between the bolt 54 on the inside, the counterbore 26, secondary counterbore 28 and the inner edge 34 of the captive washer on the outside, and the surface 66 of the structure on the bottom. Such maximum volume of the cavity 68 will be present when there is a minimum amount of bolt protrusion above the structure surface 66. Accordingly, even with such minimum extent of bolt protrusion, when the nut assembly is fully torqued down against the structure, the sealing material of insert 16 will solidly fill the cavity 68 and slightly overflow into the pressure control gates 52. In the other extreme situation, when the bolt protrudes to a maximum extent beyond the structure surface 66, the cavity 68 will still be solidly filled with sealing material of the insert 16, but there will be a greater amount of overflow, and hence the overflow will extend further into the pressure control gates 52. Preferably, the total volume provided in the pressure control gates 52 is sufficient to accommodate substantially all of the overflow of sealing material between both of the foregoing extremes; i.e., between the minimum and maximum extents of bolt protrusion beyond the exposed surface 66 of structure 62.

The sealing insert 16 is composed of a plastic sealing material which may be generally described in its physical characteristics as being generally rigid but deformable and flowable under pressure. The cross-sectional areas of the grooves or channels 52 are correlated to the extent of flowability of the sealing material of the insert 16 so that the flow of sealing material out into the grooves or channels 52 as illustrated in FIG. 4 will be restricted sufficiently to provide a desired amount of pressurization of the sealing material within the cavity 68. By thus having the cross-sectional areas of the grooves or channels 52 sufficiently restrictive relative to the flowability of the sealing material in the insert 16, a sufficient, controllable or predictable pressurization of the sealing material can be established to compress some of the sealing material between the bolt and nut threads as illustrated in FIG. 4 and between all other possible leak paths, such as between the bolt shank on the one hand and the nut and washer on the other hand, and between the nut and the surface 66 of the structure 62.

The overflow principle of the present invention allows a relatively small diameter of the primary counterbore 26, since the necessity for a large cavity in the nut to receive the sealant is thereby obviated. This small diameter counterbore 26 allows the additional shallow counterbore 28 to be provided without unduly weakening the nut or restricting the bearing surface of the nut, and this aids the sealing by providing the downwardly facing shoulder 30 on the nut body which is in closely spaced, opposing relationship to the surface 66 of structure 62. A particularly good annular seal is thereby effected between closely spaced portions of the nut body and the structure.

It is to be understood that a variety of different plastic compositions may be employed in the sealing insert 16, provided the plastic material has the characteristics of being generally rigid but formable and flowable under pressure. Certain types of plastic materials will, of course, be particularly suitable for certain end uses. For example, where nut assemblies according to the present invention are to be employed in aircraft wet wing areas, in addition to the general physical requirements hereinabove stated, the plastic material must also have fuel compatibility and structural stability under wide temperature variations, particularly under extremely cold conditions. For most purposes, it has been found preferable to employ sealing inserts composed of a thermoplastic material, and where the nut assemblies are to be employed in wet wing area, fuel tanks or the like, to employ any of the fluro-carbon plastic materials. For such purpose it has been found particularly desirable to employ one of or more of the fluro-carbon plastic materials from the group consisting of P.T.F.E. (e.g. one form of Teflon), F.E.P. (e.g. another form of Teflon), C.T.F.E. (e.g. Kel-F), polyethylene (preferably high density polyethylene) and polypropylene.

Not only does the limited escape path provided by the pressure control gates 52 create a solid seal of controlled pressurization within the cavity 68, but it additionally provides reservoir means for retaining the overflow of sealing material within the nut assembly 10 without likelihood that some of the sealing material will squirt out from between the nut body 12 and captive washer 14 into some critical location such as a wet wing area or fuel tank. Further, the escape paths provided by the pressure control gates 52 allow full seating of the nut assembly 10 when it is torqued up against the structure 62, thereby preventing cushioning on false seating of the nut when it is torqued up and subsequent relaxation of the joint by cold flow of sealing material. Nevertheless, the pressure control gates 52 are sufficiently restrictive so that once the nut assembly 10 has become fully seated as illustrated in FIG. 4, the gates 52 will provide a continuous back pressure against cold flow of material, whereby sealing effectiveness is retained. Additionally, the radial "nibs" 70 of sealing material which are formed in the grooves or channels 52 from the overflow cause the insert to be captured by and rotated with the nut upon removal of the nut from the bolt; otherwise, the compressed insert would stay on the bolt up against the structure and prevent reuse of the nut assembly.

Figure 6:
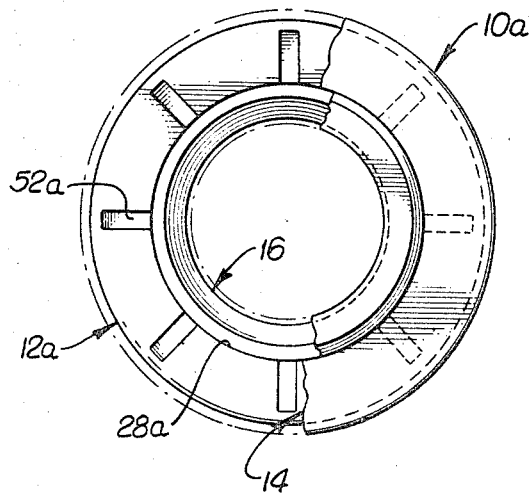
FIG. 6 is a bottom view similar to FIG. 3, but taken on the line 6–6 in FIG. 5.

FIGS. 5 and 6 illustrate a second form 10a of nut assembly according to the invention wherein the captive washer 14 and sealing insert 16 are the same as those employed in the first form, but the nut body 12a is modified by embodying radial grooves 52a which are somewhat different from the grooves 52 of the form shown in FIGS. 1 to 4. Thus, in the second form of the invention shown in FIGS. 5 and 6, the grooves 52a are arcuate, having a maximum depth where they commence at the secondary counterbore 28a, and then decreasing in depth and terminating at the face of the nut slightly radially inward of the outer periphery of the face. Utilization of such grooves 52a having a cross section which decreases according to the distance from the sealing cavity provides additional control over the pressurization of the sealing material within the cavity.

Figure 7:
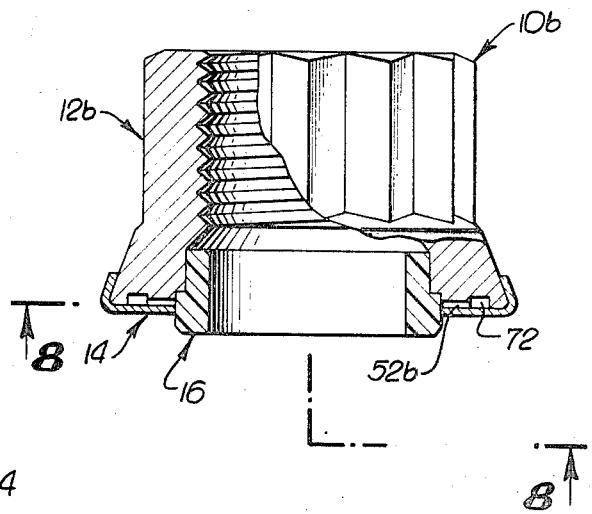
FIG. 7 is an axial section, partly in elevation, similar to FIGS. 2 and 5, but illustrating a third form of the invention.
Figure 8:
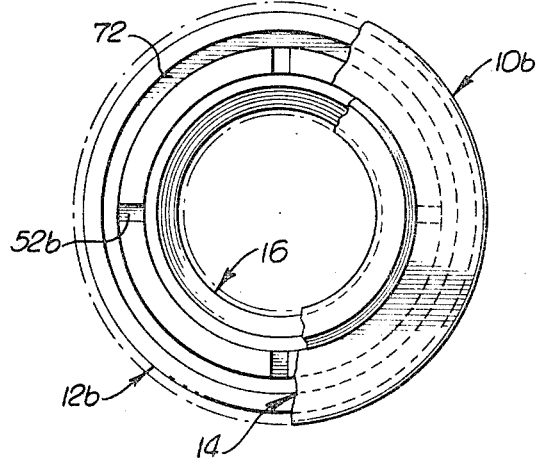
FIG. 8 is a bottom view similar to FIGS. 3 and 6, but taken on line 8–8 in FIG. 7.

FIGS. 7 and 8 illustrate a third form 10b of nut assembly according to the present invention, wherein a modified nut body 12b is employed, the body 12b having a lesser number of radially extending grooves 52b than the number of grooves in either the first form of the invention shown in FIGS. 1 to 4 or the second form shown in FIGS. 5 and 6, and wherein these radial grooves 52b are of lesser cross-sectional area than the grooves of either of the first two forms of the invention. Thus, the grooves 52b of the third form of the invention that is shown in FIGS. 7 and 8 are only four in number, as compared with the eight grooves 52 of FIGS. 1 to 4 and the eight grooves 52a of FIGS. 5 and 6, and the grooves 52b of FIGS. 7 and 8 are only approximately two-thirds the depth of the grooves 52 in the first form shown in FIGS. 1 to 4 and of the inner end portions of the grooves 52a of the second form shown in FIGS. 5 and 6. By this means, additional sealing pressure may be achieved within the nut cavity. However, in order to accommodate an amount of overflow of sealing material which very likely will be greater than the overall volume of the four relatively shallow grooves 52b, and annular groove 72 is provided in the nut face in communication with the outer ends of the radially oriented grooves 52b. Such an annular groove will accommodate a substantial amount of overflow of seal material.

Referring now to FIGS. 9 and 10 of the drawings, a fourth form 10c of the invention is there illustrated. The nut assembly 10c includes a modified nut body 12c having a plurality of grooves 52c which extend outwardly in a relatively short, open spiral from the secondary counterbore to the outer periphery of the nut body. The spiral grooves 52c are shown as having generally U-shaped cross sections, with curved bottoms which extend deeper into the nut body than the secondary counterbore. Such spiral shaped grooves 52c provide the desired restrictive cross sections of the grooves to establish the pressurization of the sealing material within the nut cavity, while at the same time providing grooves which are considerably longer in extent, and hence greater in overall volume, than corresponding grooves which are strictly radially oriented as for example the grooves of the first form of the invention shown in FIGS. 1 to 4. The spiral grooves 52c bear a similarity to the combined radial grooves 52b and annular groove 72 of the third form of nut assembly shown in FIGS. 7 and 8, in that both forms of groove means include a combination of radial and annular or circumferential components.

Referring finally to FIGS. 11 and 12 of the drawings, these figures illustrate a variation 10d of the fourth form of nut assembly shown in FIGS. 9 and 10, wherein a modified nut body 12d embodies a relatively large number of shallow V-shaped spiral grooves 52d which are much greater in their circumferential or annular extent then they are in their radial extent. The grooves 52d are thus in the form of Archimedean spirals.

It will be noted that in all forms of the invention herein shown and described, the channels or pressure control gates are in the enlarged base portion or flange of the nut, which is the strongest part of the nut. Because of this location of the grooves, and of the relatively shallow nature of the grooves, it has been found that the present invention does not materially weaken the nut structure, and for this reason it is unnecessary to beef up the nut structure as compared with the structure of conventional nuts.

While the invention has been shown and described herein in detail with a captive washer as a part of the nut assembly, it is to be understood that similar advantages will be obtained by the use of pressure control gates according to the invention although a captive washer may not be employed as a part of the nut assembly.

Although the present invention has been illustrated and described in detail herein in connection with nuts of the type having thread means in the bore for engagement with mating threads on the fastening section of the bolt, it is to be understood that the present invention is equally adaptable for use in connection with nuts adapted to be secured by other means to the fastening sections of respective bolts.

For example, it is current practice in the aircraft industry to provide some nut and bolt combinations wherein the fastening section of the bolt comprises a generally V-shaped annular groove, and the nut is in the form of an unthreaded annular collar. This collar-type nut is slipped over the groove-type fastening section of the bolt and swaged into the groove by means of a riveting gun with a collar-setting tool and bucking bar. The nut thus fills the bolt groove, with the nut being tightened against the structure being fastened, and excess nut material is trimmed off in the swaging process. This swage-collar type of fastener is sometimes referred to as a rivet. However, since it is formed of two separate parts, a bolt having a fastening section and a nut engageable with such fastening section, it will, for the purpose of the present application, be considered to be a bolt type of fastener.

It will be apparent from the foregoing detailed description and accompanying illustrations of the present invention that the invention may be embodied in the swage-collar type of nut in the same manner as in the threaded type of nut without departing from the present invention. Thus, the annular sealing insert of the invention may be seated in a counterbore opening at the face of the swage collar, projecting beyond the face, and the collar provided with a plurality of pressure control gates according to the invention. When the collar is swaged into position on the fastening section of the bolt and thereby tightened up on the bolt, the sealing insert will be compressed into the counterbore and the pressure control gates will allow the controlled release of excess sealing material from the cavity defined between the counterbore and the bolt while at the same time maintaining controlled pressurization of the sealing material in the cavity.

Accordingly, in the appended claims, except as to those claims which specifically recite internal threading and external wrenching means on the nut means, the nut means defined in the claims is intended to include nut means adapted to be secured by means other than threaded engagement to the fastening section of a bolt, including but not limited to swaging.

While the instant invention has been shown and described herein in what are conceived to be the most practical and preferred embodiments, it is recognized that departures may be made therefrom within the scope of the invention, which is therefore not to be limited to the details disclosed herein, but is to be accorded the full scope of the claims.

I claim:

1. Nut means for use with sealing material that is flowable to provide a sealed connection with a mating bolt, said nut means comprising a nut body member having a bore therethrough, a substantially flat face on one end of the body member substantially normal to the axis of the bore, and a plurality of pressure control gates in said nut means each communicating at an inner end thereof with said bore adjacent said face and extending outwardly in the nut means to allow controlled release of excess sealing material captured between the nut means and bolt when the nut means is tightened up on the bolt against structure through which the bolt extends, while at the same time maintaining controlled pressurization of said captured sealing material, said nut means including a washer member captive on the nut body member and having an annular base portion overlapping said nut face in complementary relationship to said nut face, with said base portion of the washer member extending radially inwardly no further than the inner edge of said nut face, and said pressure control gates comprising grooves in at least one of said members proximate the interface between the nut face and the base portion of the washer member occupying a minority of the area of said interface.

2. A self-sealing nut assembly adapted to provide a sealed connection with a mating bolt, said nut assembly comprising nut means including a body member having a bore therethrough, a substantially flat face on one end of the body member substantially normal to the axis of the bore, the bore having a counterbore therein opening at said face, an annular sealing member seated in said counterbore with a portion thereof projecting axially outwardly thereof and beyond the nut means, said sealing member being composed of a generally rigid plastic material that is deformable and flowable under pressure, the sealing member being compressed into the counterbore when the nut means is tightened up on the bolt against structure through which the bolt extends, and a plurality of pressure control gates in said nut means each communicating at an inner end thereof with said counterbore and extending outwardly in the nut means to allow controlled release of excess sealing material from the cavity defined between the counterbore and the bolt while at the same time maintaining controlled pressurization of the sealing material in the cavity, said nut means including a washer member captive on the nut body member and having an annular base portion overlapping said nut face in complementary relationship to said nut face, with said base portion of the washer member extending radially inwardly no further than the inner edge of said nut face, and said pressure control gates comprising grooves in at least one of said members proximate the interface between the nut face and the base portion of the washer member occupying a minority of the area of said interface.